(12) United States Patent
Matsuo et al.

(10) Patent No.: US 11,433,946 B2
(45) Date of Patent: Sep. 6, 2022

(54) VEHICLE SUPPORT MEMBER

(71) Applicant: TOYOTA JIDOSHA KABUSHIKI KAISHA, Aichi-ken (JP)

(72) Inventors: Yasuhide Matsuo, Toyota (JP); Ayaka Kagami, Inazawa (JP); Hiroshi Ichinose, Okazaki (JP); Minoru Sawafuji, Toyota (JP); Hirofumi Shibata, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/986,264

(22) Filed: Aug. 6, 2020

(65) Prior Publication Data

US 2021/0114661 A1 Apr. 22, 2021

(30) Foreign Application Priority Data

Oct. 18, 2019 (JP) .............................. JP2019-191442

(51) Int. Cl.
*B62D 21/11* (2006.01)
*B62D 27/00* (2006.01)
*B62D 29/00* (2006.01)

(52) U.S. Cl.
CPC .............. *B62D 21/11* (2013.01); *B62D 27/00* (2013.01); *B62D 29/008* (2013.01)

(58) Field of Classification Search
CPC .... B62D 21/11; B62D 29/008; B62D 25/082; B62D 25/085; B62D 27/00
See application file for complete search history.

(56) References Cited

U.S. PATENT DOCUMENTS

| | | | | |
|---|---|---|---|---|
| 7,771,137 B2* | 8/2010 | Anzai | ................... | B62D 21/11 403/379.3 |
| 8,333,395 B2* | 12/2012 | Buschjohann | ......... | B62D 21/11 280/124.109 |
| 8,740,231 B2* | 6/2014 | Shibaya | ................. | B62D 21/11 280/124.109 |
| 9,394,002 B2* | 7/2016 | Uicker | ................. | B23K 20/122 |
| 9,434,417 B2* | 9/2016 | Imanishi | ................... | B22C 9/10 |
| 9,776,660 B2* | 10/2017 | Imanishi | ................ | B62D 21/11 |
| 10,053,151 B2* | 8/2018 | Murata | ................. | B62D 21/11 |
| 10,456,963 B2* | 10/2019 | Tong | ...................... | B62D 29/04 |
| 2006/0284449 A1* | 12/2006 | Miyahara | ............... | B62D 21/11 296/204 |
| 2015/0166104 A1 | 6/2015 | Ohhama et al. | | |

FOREIGN PATENT DOCUMENTS

| | | |
|---|---|---|
| JP | 2006347464 A | 12/2006 |
| JP | 5879438 B2 | 3/2016 |
| WO | 2014017260 A1 | 1/2014 |

* cited by examiner

*Primary Examiner* — Laura Freedman
(74) *Attorney, Agent, or Firm* — Hauptman Ham, LLP

(57) ABSTRACT

A vehicle support member that is die-cast includes a fixing portion configured to fix a device arranged in a power unit room, and a fixing-portion connecting rib connecting the fixing portion and an outer peripheral wall supported on a pair of front side members constituting a vehicle body and located on an outer side of the power unit room in a width direction of a vehicle.

7 Claims, 7 Drawing Sheets

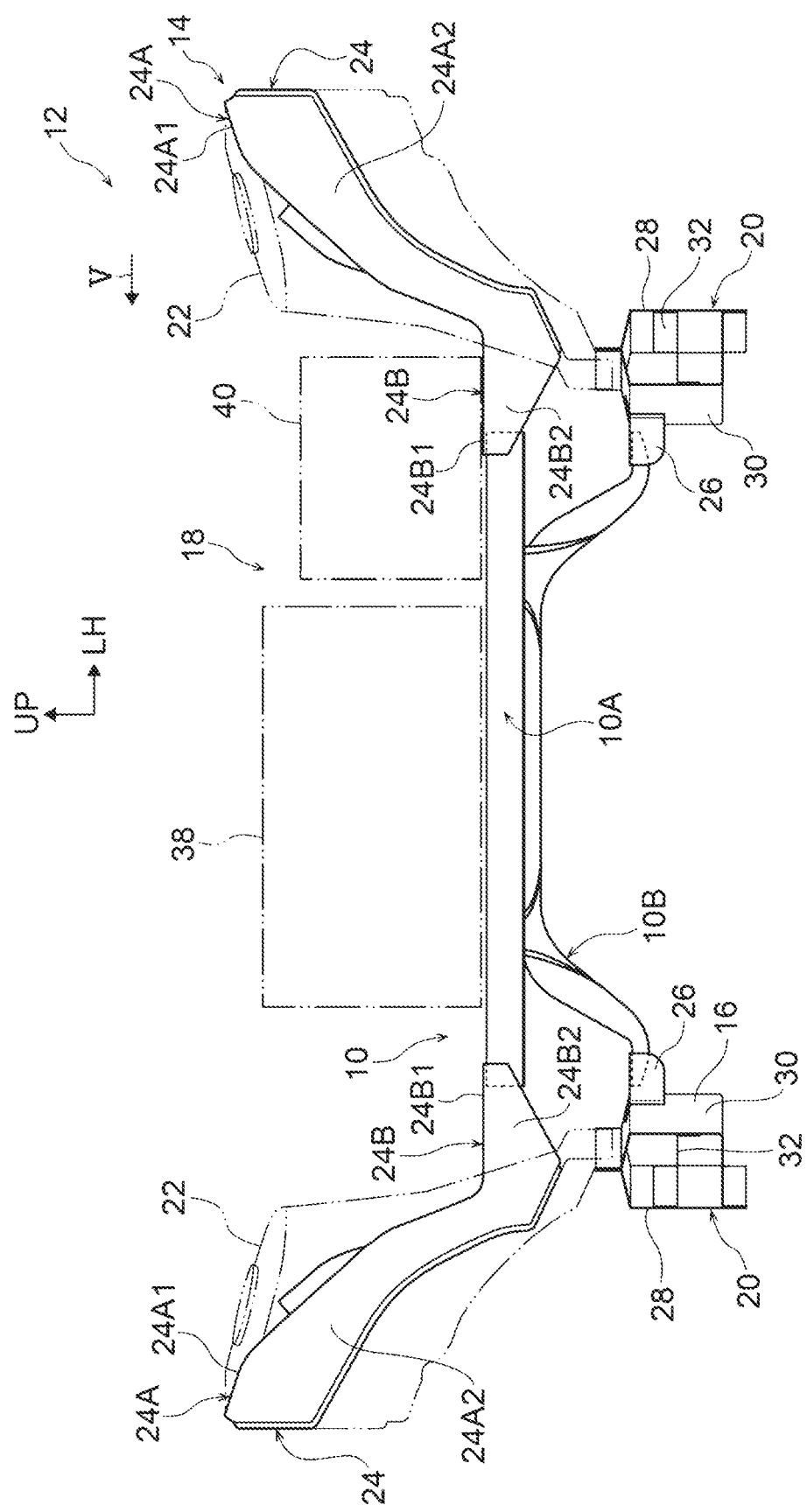

VEHICLE SUPPORT MEMBER

INCORPORATION BY REFERENCE

The disclosure of Japanese Patent Application No. 2019-191442 filed on Oct. 18, 2019 including the specification, drawings and abstract is incorporated herein by reference in its entirety.

BACKGROUND

1. Technical Field

The present disclosure relates to a vehicle support member.

2. Description of Related Art

WO 2014/017260 discloses an disclosure relating to a vehicle subframe. The vehicle subframe includes a rear cross member, which is cast (die-cast) in an aluminum alloy and bears loads from front suspensions. The rear cross member has a tubular shape that is open toward a lower side of a vehicle, and is provided with radially extending ribs inside. In the related art described in WO 2014/017260, loads input from the front suspensions to the rear cross member can be distributed and borne by the ribs.

SUMMARY

To arrange various devices in a power unit room, a member capable of supporting the devices is necessary. In the vehicle subframe according to WO 2014/017260, loads are input from the front suspensions to the rear cross member. When the devices in the power unit room are supported by the vehicle subframe according to WO 2014/017260, the loads from the front suspensions may affect the devices.

To stably support the devices in the power unit room, a device support member can preferably distribute loads of the devices as in the related art described in WO 2014/017260. However, the structure with the radially extending ribs provided as the device support member is not preferable from the viewpoint of simplification of the structure of the member.

The present disclosure provides a vehicle support member that can stably support devices in a power unit room and has a simple structure.

A vehicle support member according to a first aspect of the present disclosure is die-cast, and includes a fixing portion and a fixing-portion connecting rib. The fixing portion is configured to fix a device arranged in a power unit room. The fixing-portion connecting rib connects the fixing portion and an outer peripheral wall supported on a pair of front side members constituting a vehicle body and located on an outer side of the power unit room in a width direction of a vehicle.

According to the first aspect of the present disclosure, the vehicle support member includes the fixing portion, and the device arranged in the power unit room can be fixed to the fixing portion. In the present disclosure, the outer peripheral wall is supported on the front side members constituting the vehicle body and located on the outer side of the power unit room in the width direction of the vehicle. In the present disclosure, the device arranged in the power unit room can be supported on the vehicle body.

In the first aspect of the present disclosure, the vehicle support member is die-cast, and can absorb vibration and noise caused by the device arranged in the power unit room as compared to a vehicle support member made of a steel sheet.

To distribute a load of, for example, the self-weight of the device arranged in the power unit room, radially extending ribs may be provided around the fixing portion. However, this structure leads to complication of the structure of the present disclosure.

In the first aspect of the present disclosure, the fixing-portion connecting rib connects the outer peripheral wall and the fixing portion, and the load input from the device arranged in the power unit room to the fixing portion is transmitted to the fixing-portion connecting rib and the outer peripheral wall. As a result, the load input from the device arranged in the power unit room to the fixing portion can be distributed and borne without providing, for example, the radially extending ribs around the fixing portion.

A vehicle support member according to a second aspect of the present disclosure is as follows. In the first aspect of the present disclosure, when viewed in a vertical direction of the vehicle, a boundary of the fixing-portion connecting rib with the outer peripheral wall may be arranged along a straight line extending along a tangential direction of a boundary of the outer peripheral wall with the fixing-portion connecting rib.

According to the second aspect of the present disclosure, a load to be transmitted between the fixing-portion connecting rib and the outer peripheral wall is applied to the fixing-portion connecting rib and the outer peripheral wall in the tangential direction of the boundary of the outer peripheral wall with the fixing-portion connecting rib. Therefore, the load from the fixing portion is smoothly transmitted between the fixing-portion connecting rib and the outer peripheral wall.

A vehicle support member according to a third aspect of the present disclosure is as follows. In the first aspect of the present disclosure, the vehicle support member may include a first fixing portion serving as the fixing portion, a second fixing portion serving as the fixing portion, a first rib serving as the fixing-portion connecting rib and extending from the first fixing portion toward the second fixing portion, a second rib serving as the fixing-portion connecting rib and extending from the second fixing portion toward the first fixing portion, and a connecting wall that is a part of the outer peripheral wall and connects the first rib and the second rib.

According to the third aspect of the present disclosure, the first fixing portion is connected to the connecting wall that constitutes the outer peripheral wall via the first rib extending toward the second fixing portion. The second fixing portion is connected to the connecting wall via the second rib extending toward the first fixing portion. Therefore, the load from the first fixing portion and the load from the second fixing portion can be transmitted to the common part in the outer peripheral wall, thereby contributing to simplification of the outer peripheral wall.

A vehicle support member according to a fourth aspect of the present disclosure is as follows. In the first aspect of the present disclosure, the outer peripheral wall may include a front wall, a rear wall, a first outer wall, and a second outer wall. The front wall is arranged on a front side in a longitudinal direction of the vehicle and bridges the pair of front side members. The rear wall is arranged on a rear side in the longitudinal direction of the vehicle and bridges the pair of front side members. The first outer wall is arranged on one side in the width direction of the vehicle, is interposed between the front wall and the rear wall, and extends in the longitudinal direction of the vehicle. The second outer wall is arranged on the other side in the width direction of the vehicle, is interposed between the front wall and the rear wall, and extends in the longitudinal direction of the vehicle. The vehicle support member may further include an inner peripheral wall having an annular shape when viewed in the vertical direction of the vehicle, arranged on an inner side of the outer peripheral wall, and connected to the outer peripheral wall via a wall connecting rib.

According to the fourth aspect of the present disclosure, the outer peripheral wall includes the front wall, the rear wall, the first outer wall, and the second outer wall. The front wall is arranged on the front side in the longitudinal direction of the vehicle. The rear wall is arranged on the rear side in the longitudinal direction of the vehicle. The front wall and the rear wall bridge the front side members.

The first outer wall is arranged on one side in the width direction of the vehicle. The second outer wall is arranged on the other side in the width direction of the vehicle. The first outer wall and the second outer wall are interposed between the front wall and the rear wall, and extend in the longitudinal direction of the vehicle.

The inner peripheral wall having an annular shape when viewed in the vertical direction of the vehicle is arranged on the inner side of the outer peripheral wall when viewed in the vertical direction of the vehicle. The inner peripheral wall is connected to the outer peripheral wall via the wall connecting rib.

In the fourth aspect of the present disclosure, a part of the outer peripheral wall on the front side in the longitudinal direction of the vehicle and a part of the outer peripheral wall on the rear side in the longitudinal direction of the vehicle can be supported on the front side members. That is, the vehicle support member is supported on the vehicle body at two portions spaced away from each other in the longitudinal direction of the vehicle. In the present disclosure, the center surrounded by the inner peripheral wall is hollowed when viewed in the vertical direction of the vehicle.

A vehicle support member according to a fifth aspect of the present disclosure is as follows. In the fourth aspect of the present disclosure, the vehicle support member may further include an upper wall arranged on an upper side of the connecting wall, the first rib, the second rib, and the inner peripheral wall in the vertical direction of the vehicle and connected to the outer peripheral wall, the first rib, the second rib, and the inner peripheral wall. A distance between the inner peripheral wall and a center of the connecting wall in the width direction of the vehicle may be set shorter than a distance between the inner peripheral wall and a boundary between the connecting wall and the first rib and a distance between the inner peripheral wall and a boundary between the connecting wall and the second rib.

According to the fifth aspect of the present disclosure, the upper wall is arranged on the upper side of the connecting wall, the first rib, the second rib, and the inner peripheral wall in the vertical direction of the vehicle. The upper wall is connected to the connecting wall, the first rib, the second rib, and the inner peripheral wall. Therefore, the loads input from the first fixing portion and the second fixing portion can be distributed to the upper wall as well.

The loads are input from the first fixing portion and the second fixing portion to the upper wall via the connecting wall. Therefore, the bending moment generated in the upper wall by the loads may increase if the distance between the connecting wall and the inner peripheral wall is long.

In the fifth aspect of the present disclosure, the distance between the inner peripheral wall and the center of the connecting wall in the width direction of the vehicle is set shorter than the distance between the inner peripheral wall and the boundary between the connecting wall and the first rib and the distance between the inner peripheral wall and the boundary between the connecting wall and the second rib. Therefore, it is possible to suppress the increase in the bending moment to be generated in the upper wall by the loads from the first fixing portion and the second fixing portion.

A vehicle support member according to a sixth aspect of the present disclosure is as follows. In the fourth aspect of the disclosure, the front wall and the rear wall may extend in the width direction of the vehicle when viewed in the vertical direction of the vehicle, and lengths of the front wall and the rear wall in the width direction of the vehicle may be set larger than lengths of the first outer wall and the second outer wall in the longitudinal direction of the vehicle. The fixing-portion connecting rib may be connected to at least one of the front wall and the rear wall.

According to the sixth aspect of the present disclosure, the lengths of the front wall and the rear wall in the width direction of the vehicle are set larger than the lengths of the first outer wall and the second outer wall in the longitudinal direction of the vehicle. Therefore, the length of the power unit room in the longitudinal direction of the vehicle can be reduced.

To distribute the load input from the fixing portion, the fixing-portion connecting rib may be connected to a portion of the outer peripheral wall where a predetermined length can be secured in a predetermined direction.

In the sixth aspect of the present disclosure, the front wall and the rear wall extend in the width direction of the vehicle when viewed in the vertical direction of the vehicle, and the lengths of the front wall and the rear wall in the width direction of the vehicle are set larger than the lengths of the first outer wall and the second outer wall in the longitudinal direction of the vehicle as described above. The fixing-portion connecting rib is connected to at least one of the front wall and the rear wall. Therefore, the load input from the fixing portion is distributed more easily than a structure in which the fixing-portion connecting rib is connected to the first outer wall and the second outer wall.

A vehicle support member according to a seventh aspect of the present disclosure is as follows. In the sixth aspect of the present disclosure, the fixing-portion connecting rib may be connected to at least one of the first outer wall and the second outer wall.

According to the seventh aspect of the present disclosure, the fixing-portion connecting rib is connected to at least one of the first outer wall and the second outer wall, and the load input from the fixing portion is distributed to the at least one of the first outer wall and the second outer wall.

As described above, the vehicle support member according to the first aspect of the present disclosure attains an advantageous effect that the device in the power unit room can be supported stably and the structure can be simplified.

The vehicle support member according to the second aspect of the present disclosure attains an advantageous effect that stress concentration due to the load input from the device in the power unit room can be suppressed.

The vehicle support member according to the third aspect of the present disclosure attains an advantageous effect that the structure can be simplified while the device in the power unit room is supported at a plurality of portions.

The vehicle support member according to the fourth aspect of the present disclosure attains an advantageous effect that the device in the power unit room can be supported more stably by supporting the vehicle support member on the vehicle body at the plurality of portions spaced away from each other in the longitudinal direction of the vehicle, and the weight can be reduced.

The vehicle support member according to the fifth aspect of the present disclosure attains an advantageous effect that the load input from the device in the power unit room can further be distributed while suppressing stress concentration due to the load.

The vehicle support member according to the sixth aspect of the present disclosure attains an advantageous effect that the vehicle support member can stably support the device in the power unit room while contributing to reduction in the front overhang of the vehicle.

The vehicle support member according to the seventh aspect of the present disclosure attains an advantageous effect that the device in the power unit room can be supported more stably.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a front view schematically illustrating the structure of the vehicle including the vehicle support member according to the embodiment (view along a direction of an arrow VII in FIG. 6).

DETAILED DESCRIPTION OF EMBODIMENTS

Figure 1:
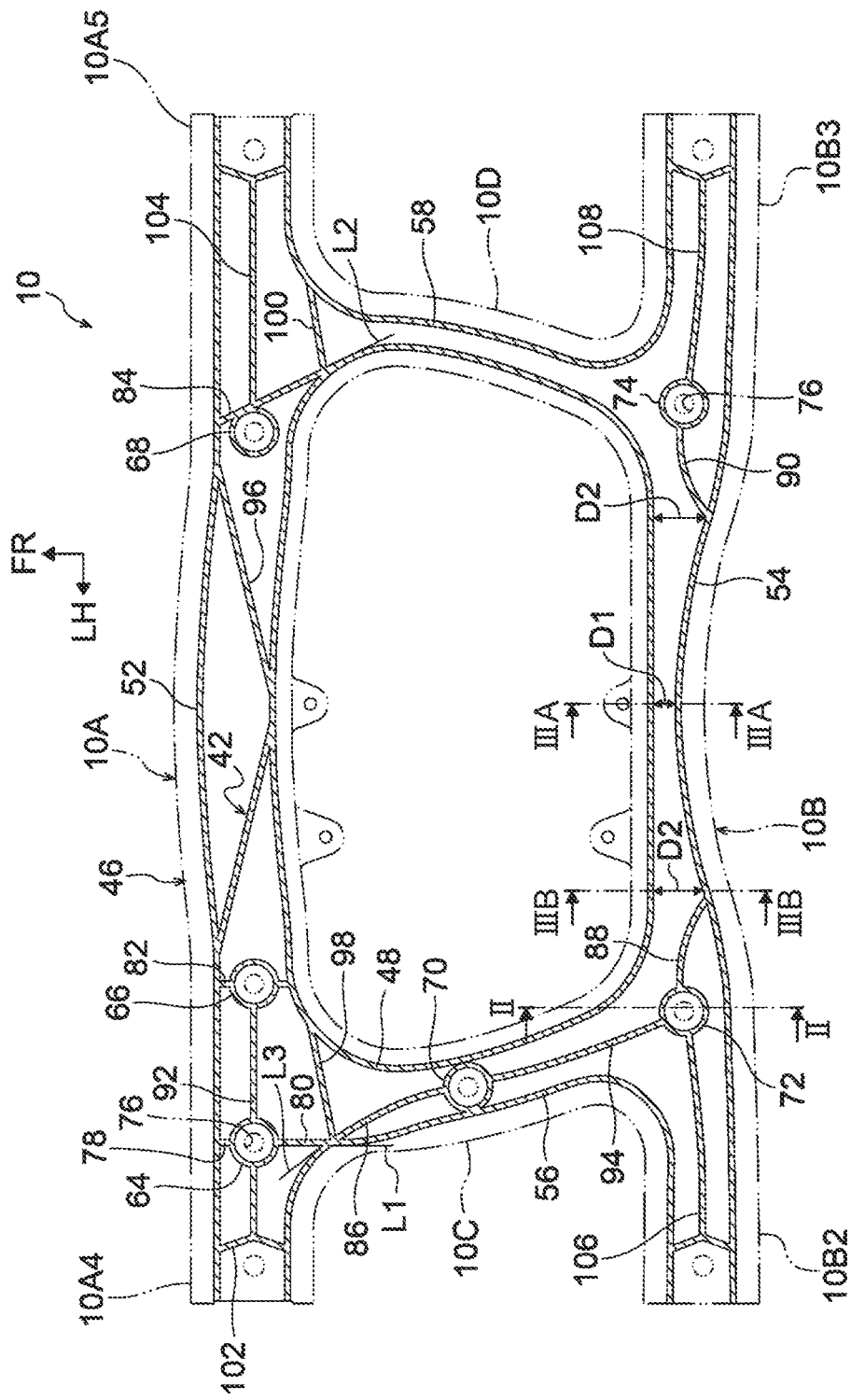
FIG. 1 is a sectional view illustrating the structure of a vehicle support member according to an embodiment (sectional view illustrating a vehicle support member cut along a line I-I in FIG. 5)

A vehicle support member according to an exemplary embodiment of the present disclosure is described below with reference to FIG. 1 to FIG. 7. An arrow FR illustrated as appropriate in the drawings indicates a front side in a longitudinal direction of a vehicle. An arrow UP illustrated as appropriate in the drawings indicates an upper side in a vertical direction of the vehicle. An arrow LH illustrated as appropriate in the drawings indicates a left side in a width direction of the vehicle.

As illustrated in FIG. 7, a "vehicle support member 10 (hereinafter referred to as a support member 10)" according to this embodiment is arranged on the upper side of a "power unit room 16" provided on a "vehicle body 14" of a "vehicle 12" in the vertical direction of the vehicle, and supports a part of a power unit 18.

Figure 6:
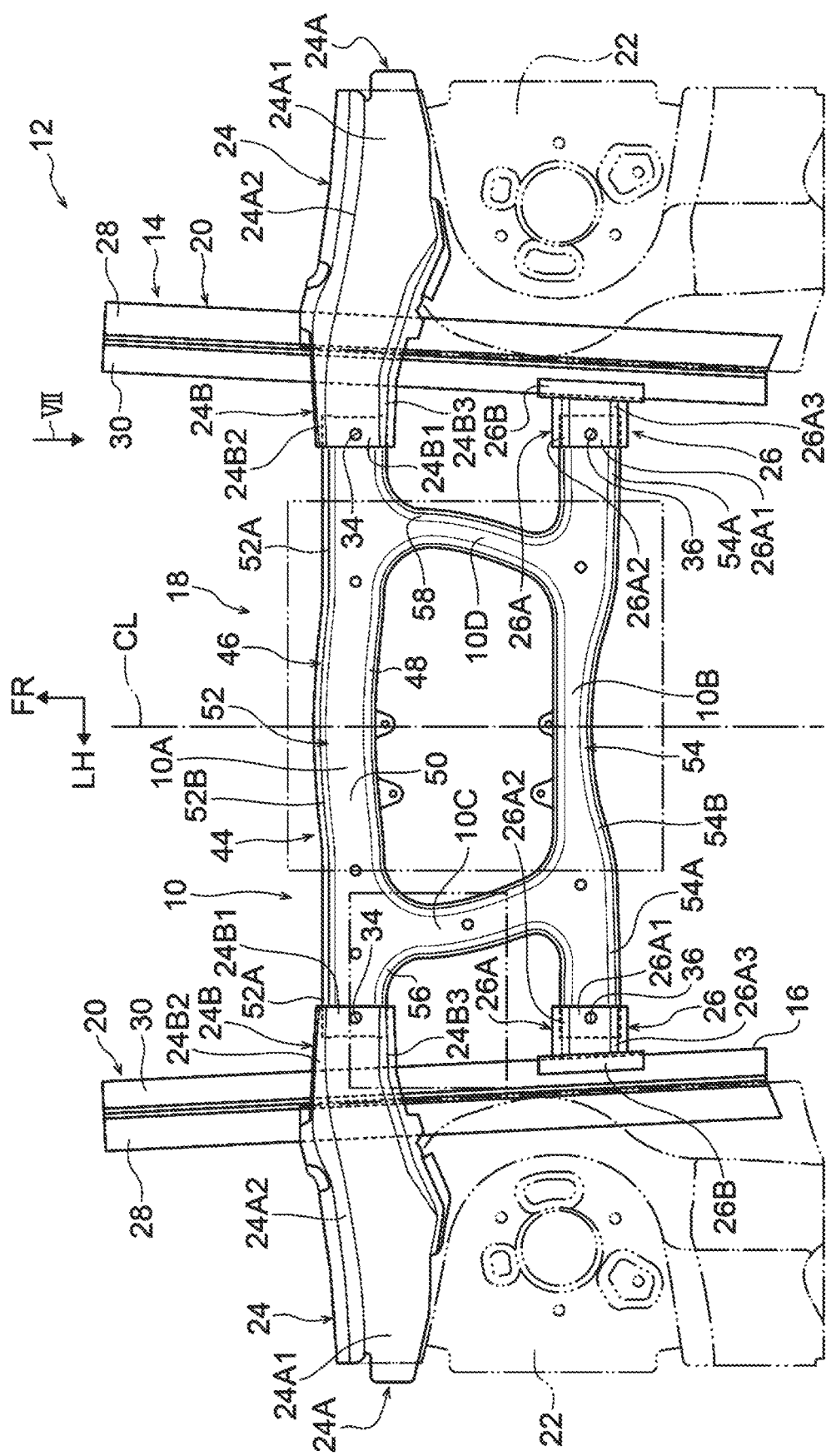
FIG. 6 is a plan view schematically illustrating the structure of the vehicle including the vehicle support member according to the embodiment.

First, the structure of the vehicle body 14 is described. The vehicle body 14 is mainly made of steel, and includes a pair of "front side members 20", a pair of suspension towers 22, a pair of support panels 24, and a pair of support brackets 26 as illustrated in FIG. 6 as well.

Each front side member 20 is arranged on an outer side of the power unit room 16 in the width direction of the vehicle. The front side member 20 includes an outer side member 28 and an inner side member 30. The outer side member 28 is an outer part in the width direction of the vehicle. The inner side member 30 is an inner part in the width direction of the vehicle. The front side member 20 has a closed section structure in which the cross section viewed in the longitudinal direction of the vehicle is a closed section. The inside of the front side member 20 is divided into two parts in the vertical direction of the vehicle by a reinforcing panel 32 connecting the outer side member 28 and the inner side member 30.

Each suspension tower 22 is open on a lower side in the vertical direction of the vehicle, and is shaped into a box or tube that can house a shock absorber (not illustrated). The edge of the suspension tower 22 on the lower side in the vertical direction of the vehicle is joined to the front side member 20 at a joining portion (not illustrated) by welding or the like.

Each support panel 24 includes a body 24A and a support portion 24B, and is arranged on the front side of the suspension tower 22 in the longitudinal direction of the vehicle. The body 24A includes an upper wall 24A1 and a front wall 24A2. The upper wall 24A1 is a part on the upper side in the vertical direction of the vehicle. The front wall 24A2 is a part on the front side in the longitudinal direction of the vehicle, and is continuous with the upper wall 24A1. The edge of the body 24A on a rear side in the longitudinal direction of the vehicle is joined to the suspension tower 22 at a joining portion (not illustrated) by welding or the like. The edge of the body 24A on the lower side in the vertical direction of the vehicle is joined to a tire-housing portion (not illustrated) at a joining portion (not illustrated) by welding or the like.

The support portion 24B includes an upper wall 24B1, a front wall 24B2, and a rear wall 24B3. The upper wall 24B1 is a part on the upper side in the vertical direction of the vehicle. The front wall 24B2 is a part on the front side in the longitudinal direction of the vehicle. The rear wall 24B3 is a part on the rear side in the longitudinal direction of the vehicle. The support portion 24B has a U-shape that is open on the lower side in the vertical direction of the vehicle when viewed in the width direction of the vehicle. The support portion 24B extends inward in the width direction of the vehicle from a part of the body 24A on the lower side in the vertical direction of the vehicle, and has an insertion portion 34 at the distal end of the upper wall 24B1. The support member 10 is attached to the insertion portion 34.

Each support bracket 26 is arranged on the rear side of the support panel 24 in the longitudinal direction of the vehicle, and is attached to the front side member 20. The support bracket 26 includes a body 26A and an attachment portion 26B.

The body 26A includes an upper wall 26A1, a front wall 26A2, and a rear wall 26A3. The upper wall 26A1 is a part on the upper side in the vertical direction of the vehicle. The front wall 26A2 is a part on the front side in the longitudinal direction of the vehicle. The rear wall 26A3 is a part on the rear side in the longitudinal direction of the vehicle. The body 26A has a U-shape that is open on the lower side in the vertical direction of the vehicle when viewed in the width direction of the vehicle. The body 26A extends inward in the width direction of the vehicle from the front side member 20, and has an insertion portion 36 at the distal end of the upper wall 26A1. The support member 10 is attached to the insertion portion 36.

The attachment portion 26B has a plate shape extending along the front side member 20, and is joined to the front side member 20 at a joining portion (not illustrated) by welding or the like.

The support bracket 26 is located on the rear side in the longitudinal direction of the vehicle and the lower side in the vertical direction of the vehicle with respect to the support portion 24B of the support panel 24 when viewed in the width direction of the vehicle.

The power unit 18 includes a "power supply unit 38" and an "auxiliary battery 40" as devices. The power supply unit 38 includes a box-shaped housing and an electronic device such as a junction box (not illustrated). The housing is an outer shell of the power supply unit 38. The electronic device is provided in the housing. The auxiliary battery 40 can supply electric power to various electrical components, and a support frame (not illustrated) is attached to the auxiliary battery 40 on the lower side in the vertical direction of the vehicle. The housing of the power supply unit 38 and the support frame attached to the auxiliary battery 40 are fixed to the support member 10 arranged on the lower side of the power supply unit 38 and the auxiliary battery 40 in the vertical direction of the vehicle.

This embodiment has a feature in that the support member 10 is die-cast in an aluminum alloy and is reinforced with a reinforcing rib portion 42 as illustrated in FIG. 1. Detailed description is now given of the structure of the support member 10 that is a main part of this embodiment.

Figure 4:
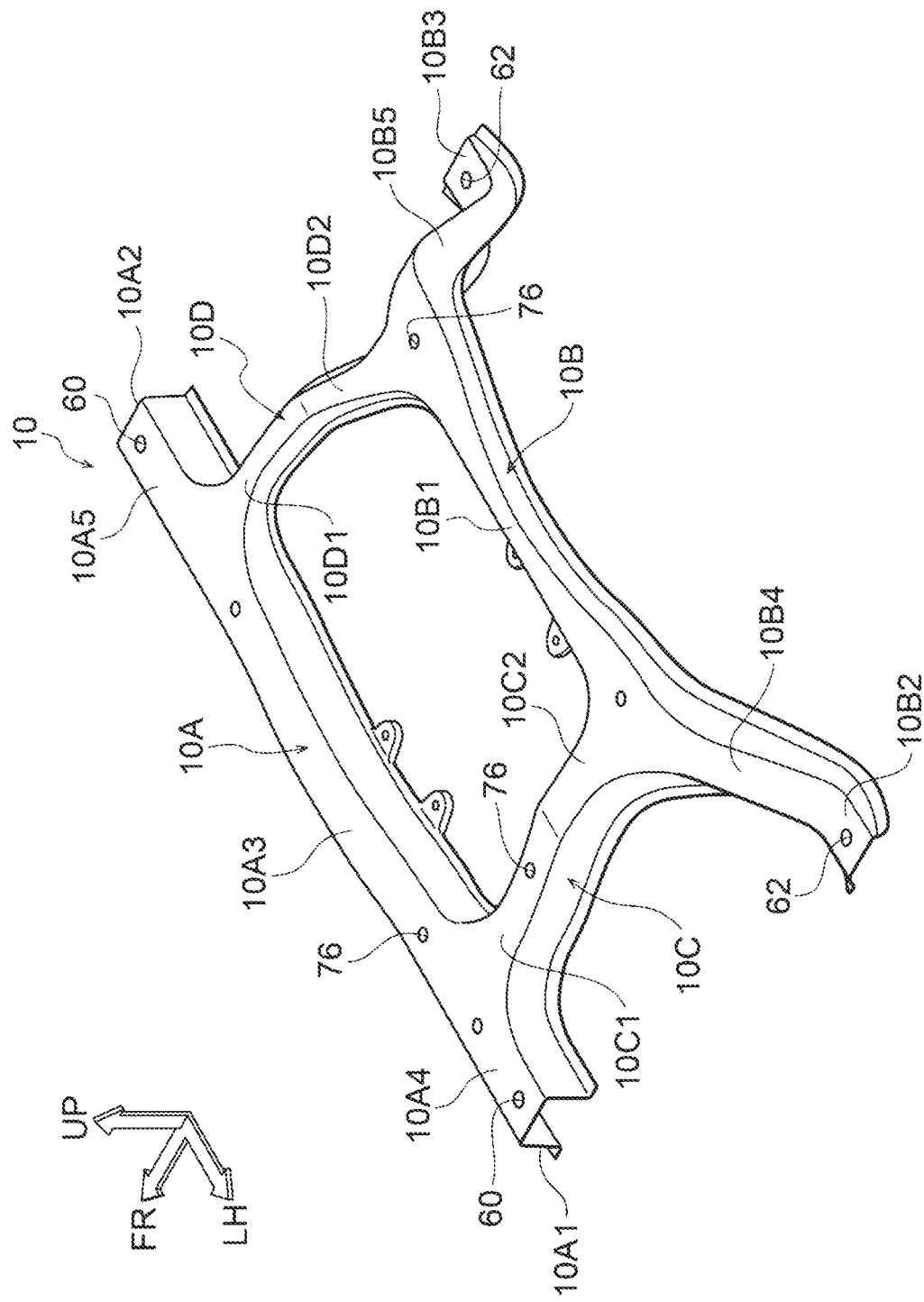
FIG. 4 is a perspective view illustrating the structure of the vehicle support member according to the embodiment.
Figure 5:
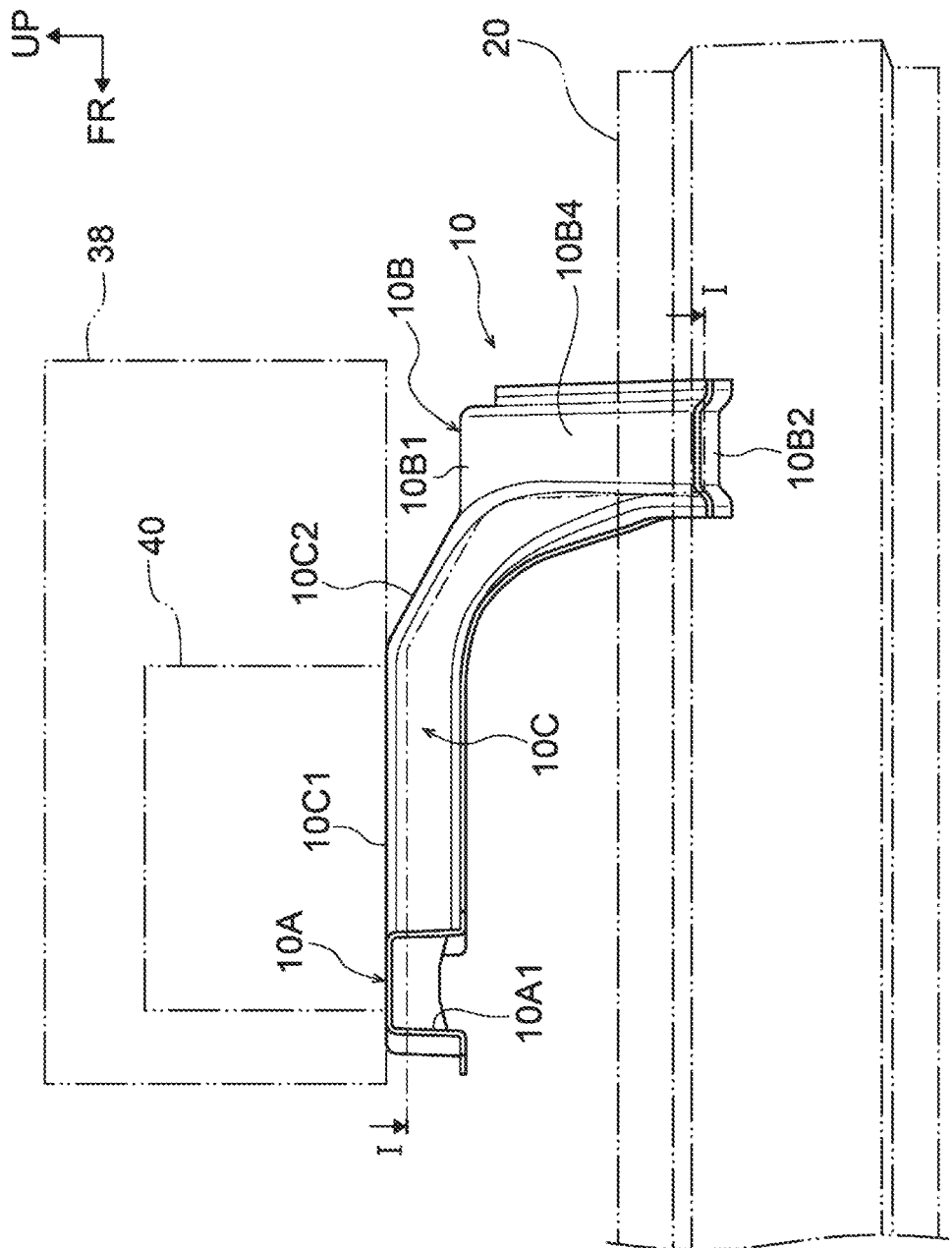
FIG. 5 is a side view schematically illustrating the structure of a vehicle including the vehicle support member according to the embodiment (view along a direction of an arrow V in FIG. 7)

First, the outer profile of the support member 10 is described. As illustrated in FIG. 4 and FIG. 5, the support member 10 includes widthwise extending portions 10A and 10B and longitudinal extending portions 10C and 10D. The support member 10 has a ladder shape when viewed in the vertical direction of the vehicle.

The widthwise extending portion 10A is a part of the support member 10 on the front side in the longitudinal direction of the vehicle, and linearly extends in the width direction of the vehicle. The sectional shape of the widthwise extending portion 10A viewed in the width direction of the vehicle is a hat shape that is open on the lower side in the vertical direction of the vehicle.

The widthwise extending portion 10B is a part of the support member 10 on the rear side in the longitudinal direction of the vehicle. The sectional shape of the widthwise extending portion 10B viewed in the width direction of the vehicle is a hat shape that is open on the lower side in the vertical direction of the vehicle. A center 10B1 of the widthwise extending portion 10B, that is, a part of the widthwise extending portion 10B that occupies about half the overall length on a central side in the width direction of the vehicle when viewed in the vertical direction of the vehicle linearly extends in the width direction of the vehicle when viewed in the longitudinal direction of the vehicle. An end 10B2 of the widthwise extending portion 10B on a left side in the width direction of the vehicle and an end 10B3 of the widthwise extending portion 10B on a right side in the width direction of the vehicle linearly extend in the width direction of the vehicle when viewed in the longitudinal direction of the vehicle.

The ends 10B2 and 10B3 are located on the lower side of the center 10B1 in the vertical direction of the vehicle. The center 10B1 is located on the lower side of the widthwise extending portion 10A in the vertical direction of the vehicle.

A portion between the center 10B1 and the end 10B2 is an inclined portion 10B4 that is inclined in a downward gradient to the left side in the width direction of the vehicle from the center 10B1. A portion between the center 10B1 and the end 10B3 is an inclined portion 10B5 that is inclined in a downward gradient to the right side in the width direction of the vehicle from the center 10B1.

As illustrated in FIG. 6 as well, the longitudinal extending portion 10C is located on a left side in the width direction of the vehicle (one side in the width direction of the vehicle) with respect to a central line CL of the vehicle 12, which extends in the longitudinal direction of the vehicle. When viewed in the vertical direction of the vehicle, the longitudinal extending portion 10C connects a position that is about a quarter of the overall length of the widthwise extending portion 10A distant from an end face 10A1 of the widthwise extending portion 10A on the left side in the width direction of the vehicle and a boundary between the center 10B1 and the inclined portion 10B4 of the widthwise extending portion 10B. The sectional shape of the longitudinal extending portion 10C viewed in the longitudinal direction of the vehicle is a hat shape that is open on the lower side in the vertical direction of the vehicle.

A part of the longitudinal extending portion 10C on the front side in the longitudinal direction of the vehicle, that is, a front part 10C1 linearly extends in the longitudinal direction of the vehicle when viewed in the width direction of the vehicle. A part of the longitudinal extending portion 10C on the rear side in the longitudinal direction of the vehicle, that is, a rear part 10C2 is inclined in a downward gradient toward the rear side of the vehicle from the front part 10C1.

As illustrated in FIG. 6 as well, the longitudinal extending portion 10D is located on a right side in the width direction of the vehicle (other side in the width direction of the vehicle) with respect to the central line CL. When viewed in the vertical direction of the vehicle, the longitudinal extending portion 10D connects a position that is about a quarter of the overall length of the widthwise extending portion 10A distant from an end face 10A2 of the widthwise extending portion 10A on the right side in the width direction of the vehicle and a boundary between the center 10B1 and the inclined portion 10B5 of the widthwise extending portion 10B. The sectional shape of the longitudinal extending portion 10D viewed in the longitudinal direction of the vehicle is a hat shape that is open on the lower side in the vertical direction of the vehicle.

A part of the longitudinal extending portion 10D on the front side in the longitudinal direction of the vehicle, that is, a front part 10D1 linearly extends in the longitudinal direction of the vehicle when viewed in the width direction of the vehicle. A part of the longitudinal extending portion 10D on the rear side in the longitudinal direction of the vehicle, that is, a rear part 10D2 is inclined in a downward gradient toward the rear side of the vehicle from the front part 10D1.

More specifically, as illustrated in FIG. 1 and FIG. 6, an outer shell 44 that is the surface of the support member 10 includes an "outer peripheral wall 46", an "inner peripheral wall 48", and an "upper wall 50". The outer peripheral wall 46 is a part on an outer peripheral side of the outer shell 44.

The inner peripheral wall 48 is a part on an inner peripheral side of the outer shell 44. The upper wall 50 is a part on the upper side in the vertical direction of the vehicle.

The outer peripheral wall 46 includes a "front wall 52", a "rear wall 54", an "outer wall 56", and an "outer wall 58". The front wall 52 is a part on the front side in the longitudinal direction of the vehicle. The rear wall 54 is a part on the rear side in the longitudinal direction of the vehicle. The outer wall 56 is a first outer wall at a part on the left side in the width direction of the vehicle. The outer wall 58 is a second outer wall at a part on the right side in the width direction of the vehicle.

The front wall 52 extends in the width direction of the vehicle, and its thickness direction correspond to the longitudinal direction of the vehicle. The front wall 52 is a part of the widthwise extending portion 10A on the front side in the longitudinal direction of the vehicle. Each part of the front wall 52 on the outer side in the width direction of the vehicle is a linear part 52A linearly extending in the width direction of the vehicle when viewed in the vertical direction of the vehicle. The center of the front wall 52 in the width direction of the vehicle is a curved part 52B that constitutes a center 10A3 of the widthwise extending portion 10A and extends in a convex shape toward the front side of the vehicle when viewed in the vertical direction of the vehicle.

The rear wall 54 extends in the width direction of the vehicle, and its thickness direction correspond to the longitudinal direction of the vehicle. The rear wall 54 is a part of the widthwise extending portion 10B on the rear side in the longitudinal direction of the vehicle. Each part of the rear wall 54 on the outer side in the width direction of the vehicle is a linear part 54A linearly extending in the width direction of the vehicle when viewed in the vertical direction of the vehicle. The center of the rear wall 54 in the width direction of the vehicle is a curved part 54B extending in a convex shape toward the front side of the vehicle when viewed in the vertical direction of the vehicle.

The outer wall 56 has a U-shape that is open on the left side in the width direction of the vehicle when viewed in the vertical direction of the vehicle. The outer wall 56 includes a part on the rear side in the longitudinal direction of the vehicle in an end 10A4 of the widthwise extending portion 10A on the left side in the width direction of the vehicle, a part of the longitudinal extending portion 10C on the left side in the width direction of the vehicle, and a part on the front side in the longitudinal direction of the vehicle in the end 10B2 of the widthwise extending portion 10B.

The outer wall 58 has a U-shape that is open on the right side in the width direction of the vehicle when viewed in the vertical direction of the vehicle. The outer wall 58 includes a part on the rear side in the longitudinal direction of the vehicle in an end 10A5 of the widthwise extending portion 10A on the right side in the width direction of the vehicle, a part of the longitudinal extending portion 10D on the right side in the width direction of the vehicle, and a part on the front side in the longitudinal direction of the vehicle in the end 10B3 of the widthwise extending portion 10B.

The lengths of the front wall 52 and the rear wall 54 in the width direction of the vehicle are set larger than the lengths of the outer walls 56 and 58 in the longitudinal direction of the vehicle.

The inner peripheral wall 48 has a rectangular ring shape when viewed in the vertical direction of the vehicle, and is arranged on an inner side of the outer peripheral wall 46. The inner peripheral wall 48 includes a part on the rear side in the longitudinal direction of the vehicle in the center 10A3 of the widthwise extending portion 10A, a part on the front side in the longitudinal direction of the vehicle in the center 10B1 of the widthwise extending portion 10B, a part of the longitudinal extending portion 10C on the inner side in the width direction of the vehicle, and a part of the longitudinal extending portion 10D on the inner side in the width direction of the vehicle.

The upper wall 50 has a ladder shape when viewed in the vertical direction of the vehicle, and also has a plate shape with its thickness direction corresponding to the vertical direction of the vehicle. The upper wall 50 is continuous with the outer peripheral wall 46 and the inner peripheral wall 48.

The upper wall 50 has insertion portions 60 at parts corresponding to the ends 10A4 and 10A5 of the widthwise extending portion 10A. The insertion portions 60 are mated with the insertion portions 34 of the support panels 24. The ends 10A4 and 10A5 of the widthwise extending portion 10A are fixed to the support portions 24B of the support panels 24 with fixing members (not illustrated) inserted through the insertion portions 34 and 60 in a state in which the ends 10A4 and 10A5 overlap the support portions 24B from the lower side in the vertical direction of the vehicle.

The upper wall 50 has insertion portions 62 at parts corresponding to the ends 10B2 and 10B3 of the widthwise extending portion 10B. The insertion portions 62 are mated with the insertion portions 36 of the support brackets 26. The ends 10B2 and 10B3 of the widthwise extending portion 10B are fixed to the support brackets 26 with fixing members (not illustrated) inserted through the insertion portions 36 and 62 in a state in which the ends 10B2 and 10B3 overlap the bodies 26A of the support brackets 26 from the lower side in the vertical direction of the vehicle.

As illustrated in FIG. 1, "fixing portions 64, 66, 68, 70, 72, and 74" and the reinforcing rib portion 42 are provided on an inner side of the outer shell 44 structured as described above.

Figure 2:
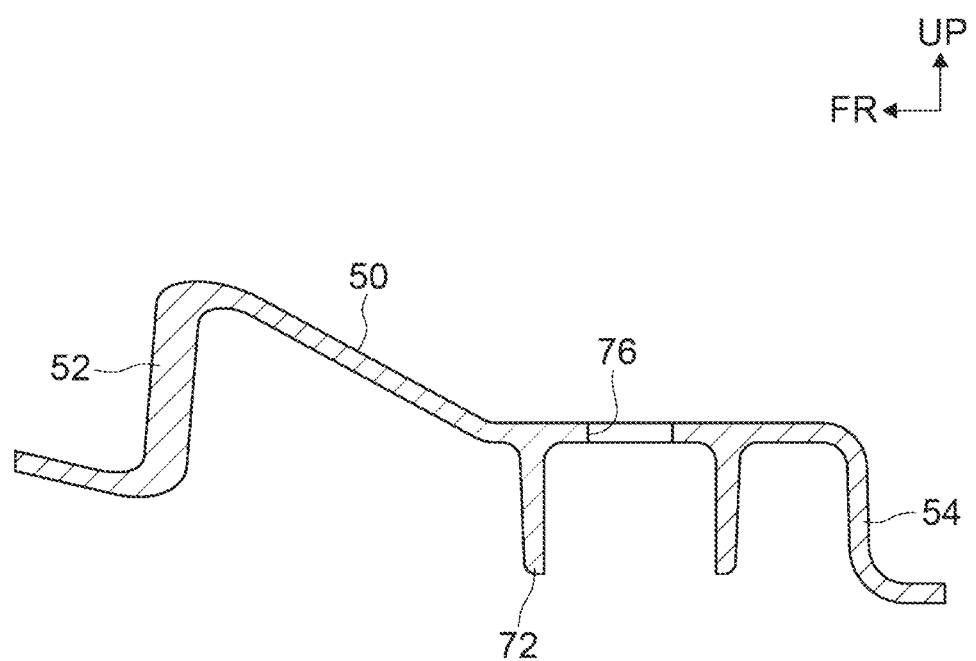
FIG. 2 is a sectional view illustrating the structure of the vehicle support member according to the embodiment (sectional view illustrating the vehicle support member cut along a line II-II in FIG. 1)

As illustrated in FIG. 2 as well, each of the fixing portions 64, 66, 68, 70, 72, and 74 has a cylindrical shape that extends from the upper wall 50 toward the lower side of the vehicle and is open on the lower side in the vertical direction of the vehicle. The upper wall 50 has insertion portions 76 corresponding to the fixing portions 64, 66, 68, 70, 72, and 74. The devices such as the power supply unit 38 and the auxiliary battery 40 are fixed to the support member 10 with fixing members (not illustrated) inserted into the fixing portions 64, 66, 68, 70, 72, and 74 and through the insertion portions 76.

More specifically, the fixing portions 64, 66, and 68 are provided in the widthwise extending portion 10A in a row along a direction in which the widthwise extending portion 10A extends. The fixing portions 64 and 66 are arranged at a boundary between the widthwise extending portion 10A and the longitudinal extending portion 10C with a predetermined distance in the width direction of the vehicle. The fixing portion 68 is arranged on an inner side in the width direction of the vehicle with respect to a boundary between the widthwise extending portion 10A and the longitudinal extending portion 10D.

The fixing portion 70 is arranged at the center of the longitudinal extending portion 10C in the longitudinal direction of the vehicle. The fixing portion 70 is provided integrally with the outer wall 56 and the inner peripheral wall 48.

The fixing portions 72 and 74 are provided in the widthwise extending portion 10B in a row along a direction in which the widthwise extending portion 10B extends. The fixing portion 72 is arranged at a boundary between the widthwise extending portion 10B and the longitudinal extending portion 10C. The fixing portion 74 is arranged at a boundary between the widthwise extending portion 10B and the longitudinal extending portion 10D.

The reinforcing rib portion 42 includes "fixing-portion connecting ribs 78, 80, 82, 84, 86, 88, and 90", fixing-portion coupling ribs 92 and 94, "wall connecting ribs 96, 98, and 100", and end reinforcing ribs 102, 104, 106, and 108.

The fixing-portion connecting rib 78 has a plate shape extending from the upper wall 50 toward the lower side of the vehicle with its thickness direction corresponding to the width direction of the vehicle. The fixing-portion connecting rib 78 connects the fixing portion 64 and the front wall 52.

The fixing-portion connecting rib 80 has a plate shape extending from the upper wall 50 toward the lower side of the vehicle and overlapping the fixing-portion connecting rib 78 when viewed in the longitudinal direction of the vehicle. The fixing-portion connecting rib 80 connects the fixing portion 64 and the outer wall 56. When viewed in the vertical direction of the vehicle, a boundary of the fixing-portion connecting rib 80 with the outer wall 56 is arranged along a straight line L1 extending along a tangential direction of a boundary of the outer wall 56 with the fixing-portion connecting rib 80. The structure in which the boundary of the fixing-portion connecting rib 80 with the outer wall 56 is arranged along the straight line L1 includes a structure in which the boundary slightly deviates from the straight line L1.

The fixing-portion connecting rib 82 has a plate shape extending from the upper wall 50 toward the lower side of the vehicle with its thickness direction corresponding to the width direction of the vehicle. The fixing-portion connecting rib 82 connects the fixing portion 66 and the front wall 52.

The fixing-portion connecting rib 84 has a plate shape extending from the upper wall 50 toward the lower side of the vehicle and also extending, when viewed in the vertical direction of the vehicle, from the rear side of the vehicle and the outer side in the width direction of the vehicle toward the front side of the vehicle and the inner side in the width direction of the vehicle. The fixing-portion connecting rib 84 connects the fixing portion 68, the front wall 52, and the inner peripheral wall 48. When viewed in the vertical direction of the vehicle, a boundary of the fixing-portion connecting rib 84 with the inner peripheral wall 48 is arranged along a straight line L2 extending along a tangential direction of a boundary of the inner peripheral wall 48 with the fixing-portion connecting rib 84. The structure in which the boundary of the fixing-portion connecting rib 84 with the inner peripheral wall 48 is arranged along the straight line L2 includes a structure in which the boundary slightly deviates from the straight line L2.

The fixing-portion connecting rib 86 has a plate shape extending from the upper wall 50 toward the lower side of the vehicle. The fixing-portion connecting rib 86 connects the fixing portion 70 and the outer wall 56. When viewed in the vertical direction of the vehicle, a boundary of the fixing-portion connecting rib 86 with the outer wall 56 is arranged along a straight line L3 extending along a tangential direction of a boundary of the outer wall 56 with the fixing-portion connecting rib 86. The structure in which the boundary of the fixing-portion connecting rib 86 with the outer wall 56 is arranged along the straight line L3 includes a structure in which the boundary slightly deviates from the straight line L3.

The fixing-portion connecting rib 88 has a plate shape extending from the upper wall 50 toward the lower side of the vehicle and also extending from the fixing portion 72 toward the fixing portion 74. The fixing-portion connecting rib 88 connects the fixing portion 72 and the rear wall 54. In this embodiment, the fixing portion 72 functions as a first fixing portion, and the fixing-portion connecting rib 88 functions as a first rib.

The fixing-portion connecting rib 90 has a plate shape extending from the upper wall 50 toward the lower side of the vehicle and also extending from the fixing portion 74 toward the fixing portion 72. The fixing-portion connecting rib 90 connects the fixing portion 74 and the rear wall 54. In this embodiment, the fixing portion 74 functions as a second fixing portion, and the fixing-portion connecting rib 90 functions as a second rib. The rear wall 54 functions as a connecting wall.

The fixing-portion coupling rib 92 has a plate shape extending from the upper wall 50 toward the lower side of the vehicle with its thickness direction corresponding to the longitudinal direction of the vehicle. The fixing-portion coupling rib 92 connects the fixing portion 64 and the fixing portion 66.

The fixing-portion coupling rib 94 has a plate shape extending from the upper wall 50 toward the lower side of the vehicle with its thickness direction corresponding to the width direction of the vehicle. The fixing-portion coupling rib 94 connects the fixing portion 70 and the fixing portion 72.

The wall connecting rib 96 has a plate shape extending from the upper wall 50 toward the lower side of the vehicle and also has a V-shape that is open on the front side in the longitudinal direction of the vehicle when viewed in the vertical direction of the vehicle. The wall connecting rib 96 connects the front wall 52 and the inner peripheral wall 48.

The wall connecting rib 98 has a plate shape extending from the upper wall 50 toward the lower side of the vehicle and also extending in the width direction of the vehicle when viewed in the vertical direction of the vehicle. The wall connecting rib 98 connects the inner peripheral wall 48 and the boundary of the outer wall 56 with the fixing-portion connecting rib 80.

The wall connecting rib 100 has a plate shape extending from the upper wall 50 toward the lower side of the vehicle and also extending in the width direction of the vehicle when viewed in the vertical direction of the vehicle. The wall connecting rib 100 connects the outer wall 58 and the boundary of the inner peripheral wall 48 with the fixing-portion connecting rib 84.

The end reinforcing rib 102 is provided at the end 10A4 of the widthwise extending portion 10A. The end reinforcing rib 102 is a plate extending from the upper wall 50 toward the lower side of the vehicle and having a Y-shape when viewed in the vertical direction of the vehicle. The end reinforcing rib 102 connects the front wall 52, the outer wall 56, and the fixing portion 64.

The end reinforcing rib 104 is provided at the end 10A5 of the widthwise extending portion 10A. The end reinforcing rib 104 is a plate extending from the upper wall 50 toward the lower side of the vehicle and having a Y-shape when viewed in the vertical direction of the vehicle. The end reinforcing rib 104 connects the front wall 52, the outer wall 58, and the fixing portion 68.

The end reinforcing rib 106 is provided at the end 10B2 of the widthwise extending portion 10B. The end reinforcing rib 106 is a plate extending from the upper wall 50 toward the lower side of the vehicle and having a Y-shape when viewed in the vertical direction of the vehicle. The end reinforcing rib 106 connects the rear wall 54, the outer wall 56, and the fixing portion 72.

The end reinforcing rib 108 is provided at the end 10B3 of the widthwise extending portion 10B. The end reinforcing rib 108 is a plate extending from the upper wall 50 toward the lower side of the vehicle and having a Y-shape when viewed in the vertical direction of the vehicle. The end reinforcing rib 108 connects the rear wall 54, the outer wall 58, and the fixing portion 74.

The thicknesses of the respective parts of the outer peripheral wall 46 and the inner peripheral wall 48 are set larger than the thicknesses of the respective parts of the reinforcing rib portion 42.

Figure 3A:
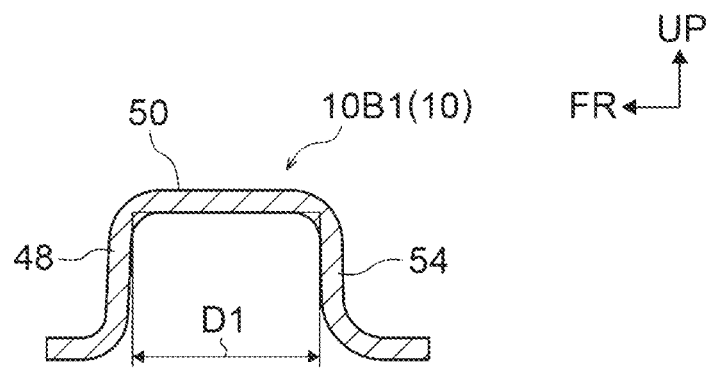
FIG. 3A is a sectional view illustrating the structure of the vehicle support member according to the embodiment in a cross section cut along a line IIIA-IIIA in FIG. 1.
Figure 3B:
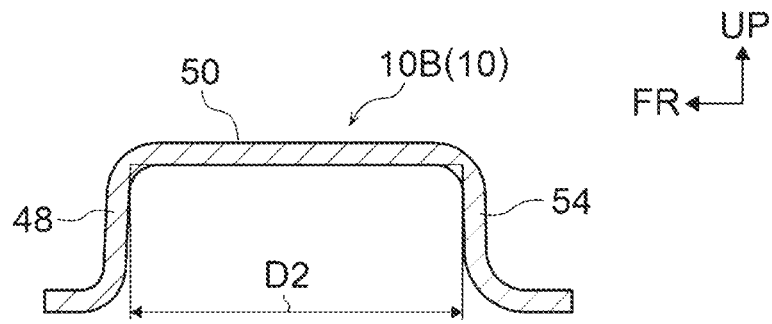
FIG. 3B is a sectional view illustrating the structure of the vehicle support member according to the embodiment in a cross section cut along a line IIIB-IIIB in FIG. 1.

As illustrated in FIG. 1, FIG. 3A, and FIG. 3B, a distance D1 between the center of the rear wall 54 and the inner peripheral wall 48 is set shorter than a distance D2 between the inner peripheral wall 48 and a boundary between the rear wall 54 and the fixing-portion connecting rib 88 or 90.

Actions and Effects of Embodiment

Next, actions and effects of this embodiment are described.

As illustrated in FIG. 1 and FIG. 6, the support member 10 according to this embodiment includes the fixing portions 64, 66, 68, 70, 72, and 74, and the devices arranged in the power unit room 16 can be fixed to the fixing portions 64, 66, 68, 70, 72, and 74. In this embodiment, the outer peripheral wall 46 is supported on the front side members 20. In this embodiment, the devices arranged in the power unit room 16 can be supported on the vehicle body 14.

In this embodiment, the support member 10 is die-cast, and can absorb vibration and noise caused by the devices arranged in the power unit room 16 as compared to a support member made of a steel sheet.

To distribute loads of, for example, the self-weights of the devices arranged in the power unit room 16, radially extending ribs may be provided around the fixing portions 64, 66, 68, 70, 72, and 74. However, this structure leads to complication of the structure of the support member 10.

This embodiment provides an example in which the fixing-portion connecting rib 78 connects the outer peripheral wall 46 and the fixing portion 64 and the loads input from the devices arranged in the power unit room 16 to the fixing portion 64 are transmitted to the fixing-portion connecting rib 78 and the outer peripheral wall 46. As a result, the loads input from the devices arranged in the power unit room 16 to the fixing portion 64 can be distributed and borne without providing, for example, the radially extending ribs around the fixing portion 64. In this embodiment, the devices in the power unit room 16 can stably be supported by the support member 10, and the structure of the support member 10 can be simplified.

By simplifying the structure of the support member 10, the structure of a die for use in the manufacture of the support member 10 can be simplified as well. Therefore, molten metal can satisfactorily flow in the die when the support member 10 is manufactured.

This embodiment provides an example in which loads to be transmitted between the fixing-portion connecting rib 80 and the outer wall 56 are applied to the fixing-portion connecting rib 80 and the outer wall 56 in the tangential direction of the boundary of the outer wall 56 with the fixing-portion connecting rib 80. Therefore, the loads from the fixing portion 64 are smoothly transmitted between the fixing-portion connecting rib 80 and the outer wall 56. In this embodiment, it is possible to suppress stress concentration on the support member 10 due to the loads input from the devices in the power unit room 16.

According to this embodiment, the fixing portion 72 is connected to the rear wall 54 that constitutes the outer peripheral wall 46 via the fixing-portion connecting rib 88 extending toward the fixing portion 74. The fixing portion 74 is connected to the rear wall 54 via the fixing-portion connecting rib 90 extending toward the fixing portion 72. Therefore, the loads from the fixing portion 72 and the loads from the fixing portion 74 can be transmitted to the common part in the outer peripheral wall 46, thereby contributing to simplification of the outer peripheral wall 46. In this embodiment, the structure of the support member 10 can be simplified while the devices in the power unit room 16 are supported at a plurality of portions by the support member 10.

According to this embodiment, the outer peripheral wall 46 includes the front wall 52, the rear wall 54, the outer wall 56, and the outer wall 58. The front wall 52 is arranged on the front side in the longitudinal direction of the vehicle. The rear wall 54 is arranged on the rear side in the longitudinal direction of the vehicle. The front wall 52 and the rear wall 54 bridge the front side members 20 via the support panels 24 and the support brackets 26.

The outer wall 56 is arranged on one side in the width direction of the vehicle. The outer wall 58 is arranged on the other side in the width direction of the vehicle. The outer walls 56 and 58 are interposed between the front wall 52 and the rear wall 54, and extend in the longitudinal direction of the vehicle.

The inner peripheral wall 48 having an annular shape when viewed in the vertical direction of the vehicle is arranged on the inner side of the outer peripheral wall 46 when viewed in the vertical direction of the vehicle. The inner peripheral wall 48 is connected to the outer peripheral wall 46 via the wall connecting ribs 96, 98, and 100.

In this embodiment, the part of the outer peripheral wall 46 on the front side in the longitudinal direction of the vehicle and the part of the outer peripheral wall 46 on the rear side in the longitudinal direction of the vehicle can be supported on the front side members 20. That is, the support member 10 is supported on the vehicle body 14 at two portions spaced away from each other in the longitudinal direction of the vehicle. In this embodiment, the center surrounded by the inner peripheral wall 48 is hollowed when viewed in the vertical direction of the vehicle. In this embodiment, the devices in the power unit room 16 can be supported more stably by supporting the support member 10 on the vehicle body 14 at the plurality of portions spaced away from each other in the longitudinal direction of the vehicle. Further, the weight of the support member 10 can be reduced.

According to this embodiment, the upper wall 50 is arranged on the upper side of the rear wall 54, the fixing-portion connecting rib 88, the fixing-portion connecting rib 90, and the inner peripheral wall 48 in the vertical direction of the vehicle. The upper wall 50 is connected to the rear wall 54, the fixing-portion connecting rib 88, the fixing-portion connecting rib 90, and the inner peripheral wall 48. Therefore, the loads input from the fixing portions 72 and 74 can be distributed to the upper wall 50 as well.

The loads are input from the fixing portions 72 and 74 to the upper wall 50 via the rear wall 54. Therefore, the bending moment generated in the upper wall 50 by the loads may increase if the distance between the rear wall 54 and the inner peripheral wall 48 is long.

In this embodiment, the distance D1 between the center of the rear wall 54 and the inner peripheral wall 48 is set shorter than the distance D2 between the inner peripheral wall 48 and the boundary between the rear wall 54 and the fixing-portion connecting rib 88 or 90. Therefore, it is possible to suppress the increase in the bending moment to be generated in the upper wall 50 by the loads from the fixing portions 72 and 74. In this embodiment, the loads input from the devices in the power unit room 16 can further be distributed while suppressing stress concentration on the support member 10 due to the loads.

According to this embodiment, the lengths of the front wall 52 and the rear wall 54 in the width direction of the vehicle are set larger than the lengths of the outer wall 56 and the outer wall 58 in the longitudinal direction of the vehicle. Therefore, the length of the power unit room 16 in the longitudinal direction of the vehicle can be reduced.

To distribute the loads input from the fixing portions 64, 66, 68, 70, 72, and 74, the fixing-portion connecting ribs 78, 80, 82, 84, 86, 88, and 90 are preferably connected to portions of the outer peripheral wall 46 where predetermined lengths can be secured in predetermined directions.

In this embodiment, the front wall 52 and the rear wall 54 extend in the width direction of the vehicle when viewed in the vertical direction of the vehicle, and the lengths of the front wall 52 and the rear wall 54 in the width direction of the vehicle are set larger than the lengths of the outer wall 56 and the outer wall 58 in the longitudinal direction of the vehicle as described above. The fixing-portion connecting rib 78 extending from the fixing portion 64, the fixing-portion connecting rib 82 extending from the fixing portion 66, and the fixing-portion connecting rib 84 extending from the fixing portion 68 are connected to the front wall 52. The fixing-portion connecting rib 88 extending from the fixing portion 72 and the fixing-portion connecting rib 90 extending from the fixing portion 74 are connected to the rear wall 54.

Therefore, the loads input from the fixing portions 64, 66, 68, 72, and 74 are distributed more easily than a structure in which the fixing-portion connecting ribs 78, 82, 84, 88, and 90 are connected to the outer walls 56 and 58. In this embodiment, the support member 10 can stably support the devices in the power unit room 16 while contributing to reduction in the front overhang of the vehicle 12.

According to this embodiment, the fixing-portion connecting rib 80 extending from the fixing portion 64 and the fixing-portion connecting rib 86 extending from the fixing portion 70 are connected to the outer wall 56, and the loads input from the fixing portions 64 and 70 are distributed to the outer wall 56. In this embodiment, the devices in the power unit room 16 can be supported more stably by the support member 10.

Supplementary Description of Embodiment (1) In the embodiment described above, the support member 10 includes the upper wall 50, but the upper wall 50 may be omitted from the support member 10 depending on, for example, specifications of the vehicle 12 to further reduce the weight of the support member 10. Various shapes may be employed as the shapes of the outer peripheral wall 46, the inner peripheral wall 48, and the reinforcing rib portion 42 depending on, for example, the specifications of the vehicle 12. For example, the sectional shapes of the respective parts of the outer shell 44 of the support member 10 may be arc shapes, and the reinforcing rib portion 42 may be adapted to the sectional shapes.

(2) In the embodiment described above, the fixing portion 72 and the fixing portion 74 are connected via the fixing-portion connecting ribs 88 and 90 and the rear wall 54, but the present disclosure is not limited to this case. Depending on, for example, the shape of the support member 10, the fixing portion 72 and the fixing portion 74 may be connected by a rear wall 54 linearly extending in the width direction of the vehicle to further reduce the weight of the support member 10.

What is claimed is:

1. A vehicle support member that is die-cast, the vehicle support member comprising:
    a fixing portion configured to fix a device arranged in a power unit room;
    a fixing-portion connecting rib connecting the fixing portion to an outer peripheral wall of the vehicle support member,
    wherein the outer peripheral wall is supported on a pair of front side members comprising a vehicle body, and the pair of front side members is located on an outer side of the power unit room in a width direction of the vehicle body,
    wherein when viewed in a vertical direction of the vehicle, a boundary of the fixing-portion connecting rib with an inner peripheral wall of the vehicle support member is arranged along a straight line extending along a tangential direction of a boundary of the inner peripheral wall with the fixing-portion connecting rib;
    front and rear widthwise extending portions of the vehicle support member; and
    left and right longitudinal extending portions of the vehicle support member, wherein each of the front and rear widthwise extending portions extend outward beyond an outer wall of each of the left and right longitudinal extending portions.

2. The vehicle support member according to claim 1, the vehicle support member further comprising:
    a plurality of fixing portions;
    a plurality of fixing-portion connecting ribs;
    a first rib of the plurality of fixing-portion connecting ribs extending from a first fixing portion of the plurality of fixing portions toward a second fixing portion of the plurality of fixing portions;
    a second rib of the plurality of fixing-portion connecting ribs extending from the second fixing portion toward the first fixing portion; and
    a connecting wall that is a part of the outer peripheral wall and connects the first rib and the second rib.

3. The vehicle support member according to claim 1, wherein the outer peripheral wall includes:
    a front wall arranged on a front side in a longitudinal direction of the vehicle and bridging the pair of front side members;
    a rear wall arranged on a rear side in the longitudinal direction of the vehicle and bridging the pair of front side members;
    a first outer wall arranged on one side in the width direction of the vehicle, interposed between the front wall and the rear wall, and extending in the longitudinal direction of the vehicle; and
    a second outer wall arranged on the other side in the width direction of the vehicle, interposed between the front wall and the rear wall, and extending in the longitudinal direction of the vehicle, and
    the inner peripheral wall having an annular shape when viewed in the vertical direction of the vehicle, arranged on an inner side of the outer peripheral wall, and connected to the outer peripheral wall via a wall connecting rib.

4. The vehicle support member according to claim 3, the vehicle support member further comprising:
a plurality of fixing portions;
a plurality of fixing-portion connecting ribs;
a first rib of the plurality of fixing-portion connecting ribs extending from a first fixing portion of the plurality of fixing portions toward a second fixing portion of the plurality of fixing portions;
a second rib of the plurality of fixing-portion connecting ribs extending from the second fixing portion toward the first fixing portion;
a connecting wall that is a part of the outer peripheral wall and connects the first rib and the second rib; and
an upper wall arranged on an upper side of the connecting wall, the first rib, the second rib, and the inner peripheral wall in the vertical direction of the vehicle and connected to the outer peripheral wall, the first rib, the second rib, and the inner peripheral wall,
wherein a distance between the inner peripheral wall and a center of the connecting wall in the width direction of the vehicle is set shorter than a distance between the inner peripheral wall and a boundary between the connecting wall and the first rib and a distance between the inner peripheral wall and a boundary between the connecting wall and the second rib.

5. The vehicle support member according to claim 3, wherein:
the front wall and the rear wall extend in the width direction of the vehicle when viewed in the vertical direction of the vehicle, and lengths of the front wall and the rear wall in the width direction of the vehicle are set larger than lengths of the first outer wall and the second outer wall in the longitudinal direction of the vehicle; and
the fixing-portion connecting rib is connected to at least one of the front wall and the rear wall.

6. The vehicle support member according to claim 5, wherein the fixing-portion connecting rib is connected to at least one of the first outer wall and the second outer wall.

7. A vehicle support member that is die-cast, the vehicle support member comprising:
a fixing portion configured to fix a device arranged in a power unit room;
a fixing-portion connecting rib connecting the fixing portion to an outer peripheral wall of the vehicle support member,
wherein the outer peripheral wall is supported on a pair of front side members comprising a vehicle body, and the pair of front side members is located on an outer side of the power unit room in a width direction of the vehicle body,
wherein the outer peripheral wall includes:
a front wall arranged on a front side in a longitudinal direction of the vehicle and bridging the pair of front side members;
a rear wall arranged on a rear side in the longitudinal direction of the vehicle and bridging the pair of front side members;
a first outer wall arranged on one side in the width direction of the vehicle, interposed between the front wall and the rear wall, and extending in the longitudinal direction of the vehicle; and
a second outer wall arranged on the other side in the width direction of the vehicle, interposed between the front wall and the rear wall, and extending in the longitudinal direction of the vehicle, and
the vehicle support member further includes an inner peripheral wall having an annular shape when viewed in a vertical direction of the vehicle, arranged on an inner side of the outer peripheral wall, and connected to the outer peripheral wall via a wall connecting rib.

* * * * *